(12) United States Patent
Sugata et al.

(10) Patent No.: US 8,473,092 B2
(45) Date of Patent: Jun. 25, 2013

(54) COMPLETE ROUND WORKING METHOD AND COMPLETE ROUND WORKING DEVICE IN NC MACHINE TOOL

(75) Inventors: Shinsuke Sugata, Fukuyama (JP); Kunihiko Murakami, Fukuyama (JP)

(73) Assignee: Horkos Corporation, Hiroshima (JP)

( * ) Notice: Subject to any disclaimer, the term of this patent is extended or adjusted under 35 U.S.C. 154(b) by 944 days.

(21) Appl. No.: 11/659,424

(22) PCT Filed: Aug. 5, 2005

(86) PCT No.: PCT/JP2005/014808
§ 371 (c)(1),
(2), (4) Date: Feb. 5, 2007

(87) PCT Pub. No.: WO2006/014030
PCT Pub. Date: Feb. 9, 2006

(65) Prior Publication Data
US 2008/0312868 A1 Dec. 18, 2008

(30) Foreign Application Priority Data
Aug. 6, 2004 (JP) ................................ 2004-231743

(51) Int. Cl.
| | | |
|---|---|---|
| *G06F 19/00* | (2006.01) | |
| *G01B 5/08* | (2006.01) | |
| *G01B 7/12* | (2006.01) | |
| *G01B 11/08* | (2006.01) | |
| *C01B 13/08* | (2006.01) | |
| *G01B 21/10* | (2006.01) | |

(52) U.S. Cl.
USPC ............ 700/187; 700/183; 700/193; 702/157

(58) Field of Classification Search
USPC ............................ 700/187, 183, 193; 702/157
See application file for complete search history.

(56) References Cited

U.S. PATENT DOCUMENTS 3,866,179 A * 2/1975 McGee et al. .................... 700/9
4,478,538 A * 10/1984 Kakino ............................ 408/6
(Continued)

FOREIGN PATENT DOCUMENTS

| EP | 0 258 471 A1 | 3/1988 |
| JP | 61-209857 A | 9/1986 |

(Continued)

OTHER PUBLICATIONS

Kakino et al.: "The measurement of motion errors of NC machine tools and diagnosis of their origins by using telescopic magnetic ball bar method", CIRP Annals 1987 Technische Rundschau, vol. 36, No. 1, pp. 377-380, 1987.

(Continued)

*Primary Examiner* — Kavita Padmanabhan
*Assistant Examiner* — Jason Lin
(74) *Attorney, Agent, or Firm* — Birch, Stewart, Kolasch & Birch, LLP

(57) ABSTRACT

A working route of a main shaft is divided into a plurality of measurement points, and a length from a center of a complete round to the working route of the main shaft at each of the measurement points is measured, and this measured value is compared with a radial length of the complete round to operate a deviation amount from the complete round at each of the measurement points. This deviation amount is utilized to find a transferred position. As correction values for correcting the deviation value, an X-axis incremental amount and a Y-axis incremental amount obtained from a difference in the transferred position between the respective measurement points, or an X-axis absolute value and a Y-axis absolute value of the transferred position at each of the measurement points are incorporated into an NC working program to perform complete round working according to the program.

6 Claims, 9 Drawing Sheets

U.S. PATENT DOCUMENTS

| | | | |
|---|---|---|---|
| 4,503,493 A * | 3/1985 | Burkhardt et al. | 700/190 |
| 4,639,868 A * | 1/1987 | Tanaka et al. | 702/9 |
| 5,005,135 A * | 4/1991 | Morser et al. | 700/193 |
| 5,694,339 A * | 12/1997 | Ishitoya et al. | 702/167 |
| 5,726,896 A * | 3/1998 | Jia et al. | 700/187 |
| 6,167,325 A * | 12/2000 | Kamiguchi et al. | 700/183 |
| 6,266,570 B1 * | 7/2001 | Hocherl et al. | 700/54 |
| 7,012,395 B2 * | 3/2006 | Haunerdinger et al. | 318/573 |
| 2003/0023336 A1 * | 1/2003 | Kreidler et al. | 700/108 |
| 2004/0181307 A1 * | 9/2004 | Hirai et al. | 700/194 |
| 2005/0222706 A1 * | 10/2005 | Muraki et al. | 700/187 |
| 2005/0246052 A1 * | 11/2005 | Coleman et al. | 700/188 |

FOREIGN PATENT DOCUMENTS

| | | |
|---|---|---|
| JP | 1-234161 A | 9/1989 |
| JP | 4-240051 A | 8/1992 |
| JP | 11-53019 A | 2/1999 |

OTHER PUBLICATIONS

Lo Chih-Ching et al.: "Method of tool path compensation for repeated machining process", International Journal of Machine Tools & Manufacture 1998, vol. 38, No. 3, pp. 205-213, Mar. 1998.

Suh et al.: "Contouring performance measurement and evaluation of NC machine controller for virtual machining CAM system", International Journal of Advanced Manufacturing Technology, Springer-Verlag UK, vol. 16, No. 4, pp. 271-276.

Tsutsumi M et al.: "Identification and compensation of systematic deviations particular to 5-axis machining centers", International Journal of Machine Tools & Manufacture, Elsevier UK, vol. 43, No. 8, pp. 771-780.

* cited by examiner

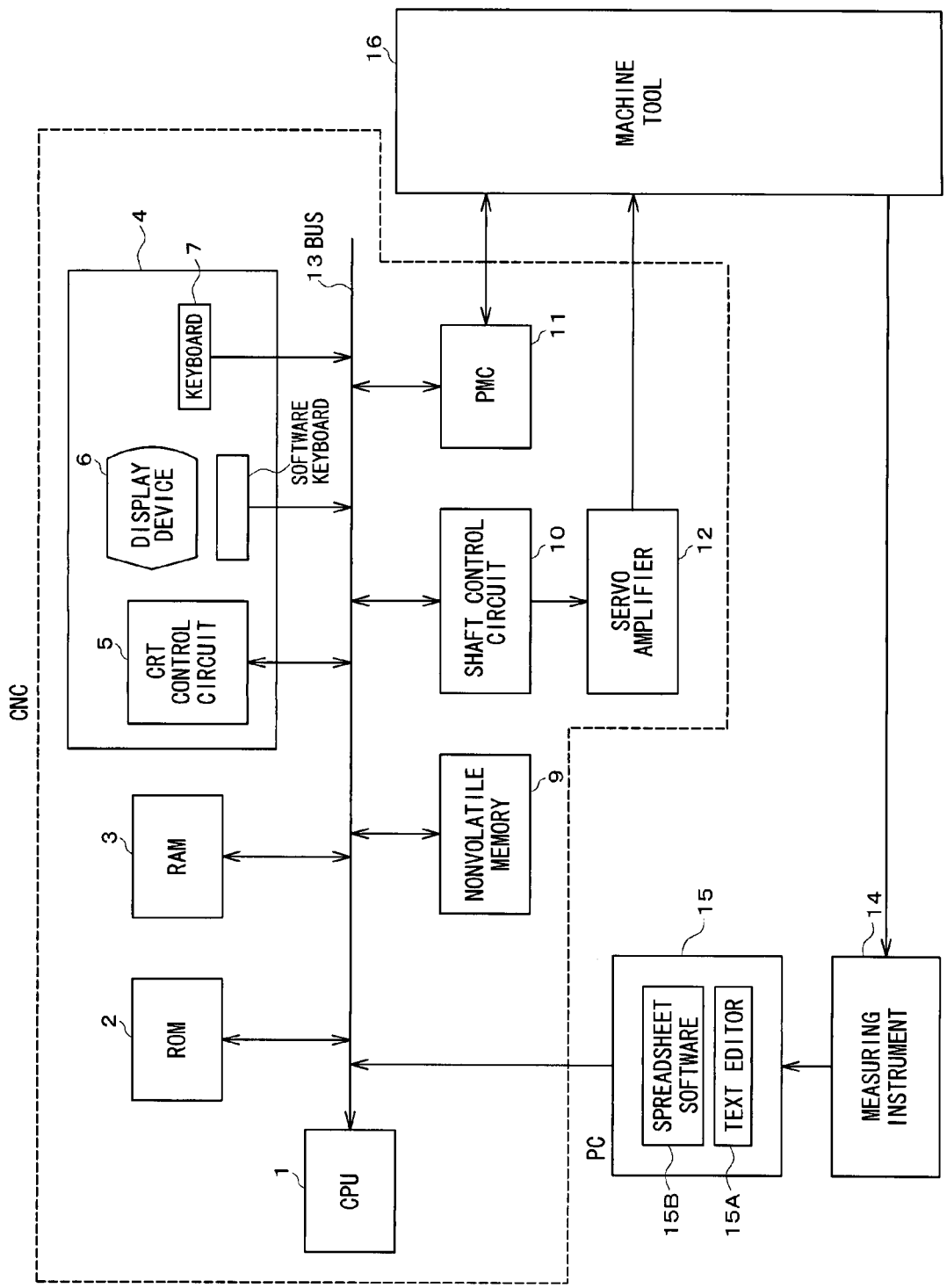

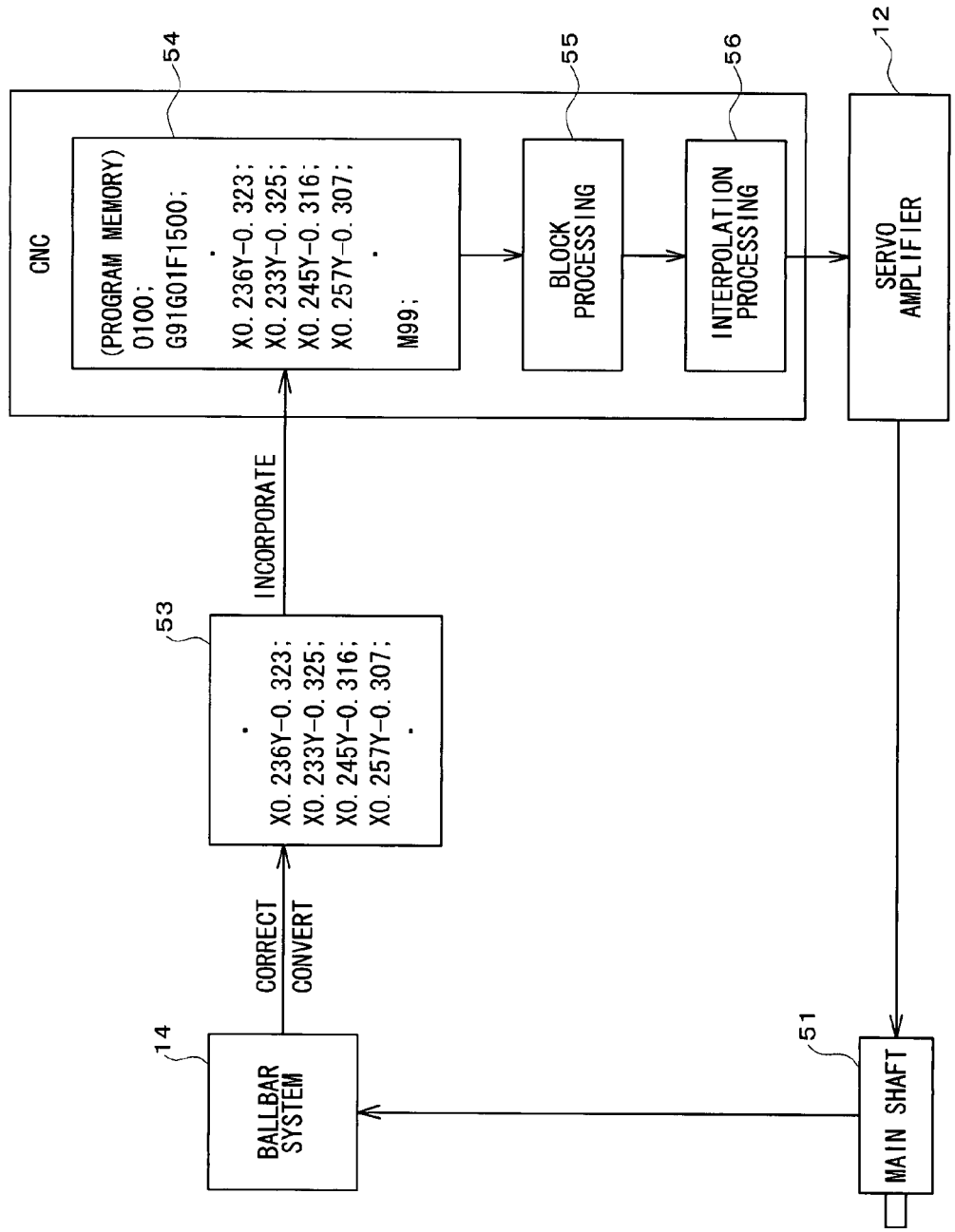

F I G. 6

| 61 | 62 | 63 | 64 | 65 | 66 | 67 | 68 | 69 | 70 | 71 |
|---|---|---|---|---|---|---|---|---|---|---|
| INCREASED OR DECREASED AMOUNT OF BALLBAR | RADIAL LENGTH WITH INCREASED OR DECREASED AMOUNT TRANSFERRED | MEASUREMENT POINT | CONVERSION INTO ANGLE(°) | CONVERSION INTO ANGLE (RADIAN) | LENGTH OF BALLBAR *cos (RADIAN) X-AXIS | LENGTH OF BALLBAR *sin (RADIAN) Y-AXIS | CONVERSION INTO INCREMENTAL AMOUNT (X-AXIS) | CONVERSION INTO INCREMENTAL AMOUNT (Y-AXIS) | NC MOVEMENT AMOUNT (X-AXIS) | NC MOVEMENT AMOUNT (Y-AXIS) |
| . | . | . | . | . | . | . | . | . | . | . |
| . | . | . | . | . | . | . | . | . | . | . |
| . | . | . | . | . | . | . | . | . | . | . |
| 0.0011 | 99.9989 | 621 | 142.3043 | 2.483678 | 79.126 | 61.14614 | 0.23588 | -0.32323 | 236 | -323 |
| 0.015 | 99.985 | 622 | 142.5334 | 2.487677 | 79.3589 | 60.82074 | 0.23289 | -0.32541 | 233 | -325 |
| 0.012 | 99.988 | 623 | 142.7626 | 2.491677 | 79.6039 | 60.50467 | 0.245 | -0.31606 | 245 | -316 |
| -0.007 | 100.007 | 624 | 142.9917 | 2.495676 | 79.8604 | 60.19725 | 0.25652 | -0.30742 | 257 | -307 |
| . | . | . | . | . | . | . | . | . | . | . |
| . | . | . | . | . | . | . | . | . | . | . |
| . | . | . | . | . | . | . | . | . | . | . |

COMPLETE ROUND WORKING METHOD AND COMPLETE ROUND WORKING DEVICE IN NC MACHINE TOOL

TECHNICAL FIELD

The present invention relates to a complete round working method and a complete round working device in the case where complete round working is applied to a workpiece using contouring working in an NC machine tool.

BACKGROUND ART

In an NC (Numerical Control) machine tool, contouring working may be used in the case where cutting working of a complete round is applied to a workpiece. The contouring working is working in which a grindstone attached to a main shaft is inserted into a hole of the workpiece and cutting is applied to an inside wall of the hole by moving the grindstone along the outline of the hole while rotating the grindstone.

Conventionally, whether or not the cut hole is a complete round has been determined by measuring a roundness error using a ballbar type measuring arm shown in Japanese Patent Application Laid-Open No. 61-209857 (FIG. 1), or by measuring the roundness error by a measurement device as shown in Japanese Patent Application Laid-Open No. 4-240051 (FIG. 1). This error includes a position error caused by elastic change of a feed shaft drive system with change in feed speed and feed direction of a machine tool, a position error caused by rolling/pitching/yawing motion of a moving body such as a slide carrying a main shaft, and a position error caused by follow-up delay of a servomotor.

Although rigidity of the feed shaft drive system has been increased or the follow-up delay of the servomotor system has been solved in order to correct these position errors conventionally, it has been difficult to assure accuracy of a complete round in these methods. Also, it has been very difficult to solve the position error caused by rolling/pitching/yawing motion of the moving body such as the slide carrying the main shaft.

DISCLOSURE OF THE INVENTION

An object of the present invention is to easily assure working accuracy of a complete round by eliminating a decrease in accuracy due to a position error caused by elastic change of a feed shaft drive system with change in feed speed and feed direction of an NC machine tool, and a position error caused by rolling/pitching/yawing motion of a moving body such as a slide carrying a main shaft, wherever a working position of a workpiece is. Moreover, another object of the present invention is to solve an effect of a position error caused by follow-up delay of a servomotor and the like.

In the present invention, a working route of a main shaft is divided into a plurality of measurement points (for example, 1573 points), a length from a center of a complete round to the working route of the main shaft at each of the measurement points is measured using a ballbar type measuring arm, for example, and this measured value is compared with a radial length of the complete round to operate a deviation amount (expansion amount/contraction amount) from the complete round of the working route of the main shaft at each of the measurement points. Based on this deviation amount, a correction value for correcting the working route of the main shaft at each of the measurement points is operated, and this correction value is incorporated into an NC working program to control the motion of the main shaft according to working program, thereby performing complete round working.

In the present invention, the deviation amount of the working route from the complete round is transferred symmetrically about the complete round in a radial direction of the complete round to find a transferred position, and based on this position data of this transferred position, the correction value can be calculated. More specifically, an incremental amount of each coordinate obtained from a difference in the transferred position between the respective measurement points, or an absolute value of each coordinate of the transferred position at each of the measurement points can be the correction value.

BRIEF DESCRIPTION OF THE DRAWINGS

FIG. 1 is a hardware configuration diagram of a first embodiment of the present invention.

FIG. 5 is a diagram for explaining a creation example of an NC part program in the first embodiment of the present invention.

FIG. 6 is a chart showing an example of measurement data and processing data in the first embodiment of the present invention.

BEST MODE FOR CARRYING OUT THE INVENTION

First Embodiment

Figure 2A:
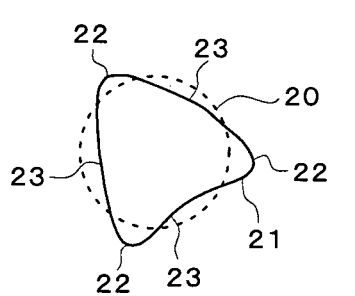
FIGS. 2A, 2B, 2C are diagrams for explaining a relation between a complete round and a measurement result by a ballbar.

FIG. 1 is a hardware configuration diagram of a first embodiment of the present invention. A CPU 1 controls the whole of a numerical control device CNC according to a system program stored in a ROM 2. Reference numeral 3 denotes a RAM that temporarily stores data. In a nonvolatile memory 9, a part program to be held after power-off, parameters, a pitch error correction amount, a tool correction amount and the like are stored. As this nonvolatile memory 9, a CMOS (Complementary Metal Oxide Semiconductor) backed up by a battery not shown in the figure is used. A CRT control circuit 5 inside of an operation display unit 4 converts a digital signal into a signal for display to supply to a display device 6. For the display device 6, a CRT or a liquid crystal display device is used. On a screen of this display device 6, a menu of working and data are displayed. A keyboard 7 is composed of address keys, numeric keys and the like, and the use of these keys allows data to be inputted. A PMC (programmable controller) 11 processes an M function signal received via a bus 13, and the like by a sequence program and outputs a control signal to control a machine tool 16. Moreover, the PMC 11 receives an input signal from the machine tool 16 side to process it by a sequence program and transfers the input signal necessary for the CPU 1 via the bus 13. A shaft control circuit 10 receives a shaft movement command from the CPU 1 and outputs a command to move the shaft to a servo amplifier 12. The servo amplifier 12 receives this movement command and drives a servomotor of the machine tool 16. The respective components described above are coupled to one another by the bus 13.

Reference numeral 14 denotes a measuring instrument that measures an error of contouring working in the machine tool 16 using a ballbar. Data measured by the measuring instrument 14 is accumulated as a text file in a personal computer (hereinafter, referred to as "PC") 15. That is, in the PC 15, a measured deviation amount of expansion/contraction of the ballbar is copied to a file of a program for spreadsheet (hereinafter, referred to as "spreadsheet software") 15B, using a text editor 15A, and based on this, correction data is operated. A detailed description of this operation processing will be given later.

Figure 2B:
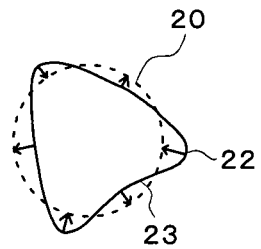
Figure 2C:
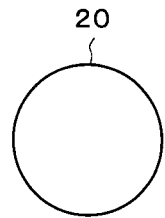

FIG. 2A to 2C are diagrams for explaining a relation between a complete round and a measurement result by the ballbar. In FIG. 2A, dashed line denotes a complete round 20 applied to contouring processing, solid line denotes a route 21 of the main shaft measured by the ballbar (not shown), which is one of devices that measure a deviation from the complete round 20 in a radial direction. In FIG. 2A, the route 21 of the main shaft is deviated from the complete round 20, and projected portions 22 and recessed portions 23 are shape errors with respect to the complete round 20. The projected portions 22 are errors of +, and the recessed portions 23 are errors of −. Accordingly, as shown in FIG. 2B, the correction is performed so as to retract the projected portions 22 as shown by arrow, and to protrude the recessed portions 23 as shown by arrow, by which working can be performed so as to obtain the complete round 20 as shown in FIG. 2C.

Figure 3:
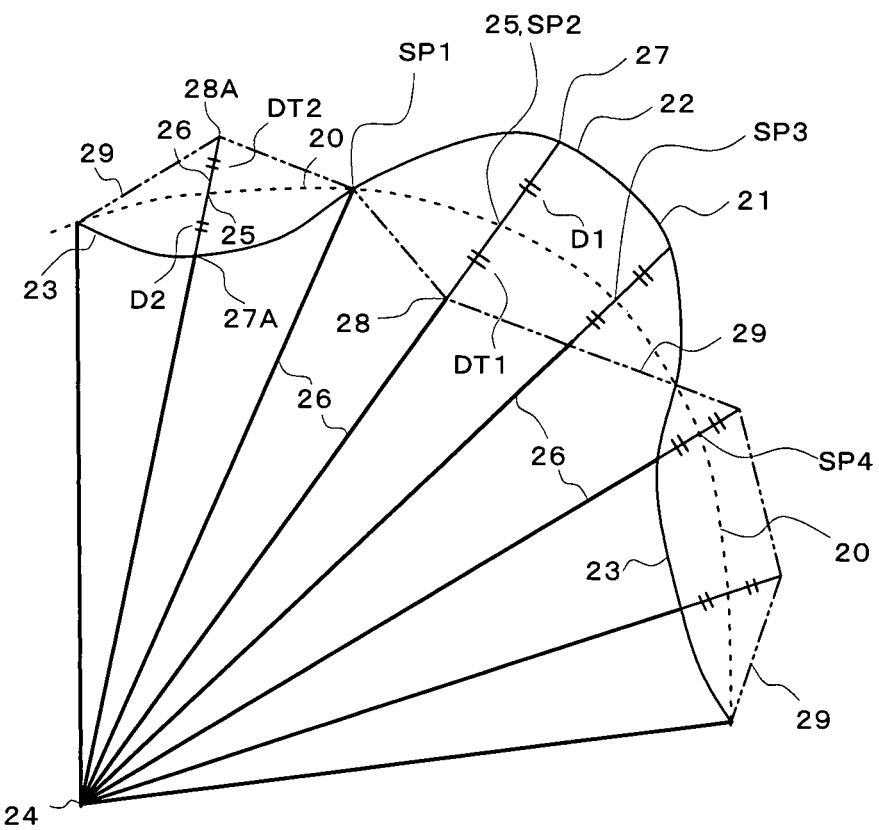
FIG. 3 is a diagram for explaining correction of position error in the first embodiment of the present invention.

Referring to FIG. 3, this correction is described. Hereinafter, measurement points in a circumferential direction of the complete round 20 are assumed to be 1573 points. The measuring instrument 14 measures the deviation in the radial direction from the complete round, that is, an expansion/contract amount from the complete round by the ballbar at each of the measurement points, every about 0.228° (360°/1573). In FIG. 3, chained line indicated by reference numeral 20 denotes a route in the case where the main shaft (not shown) is assumed to perform complete round working. Solid line indicated by reference numeral 21 denotes an actual route when the main shaft moves to cut, that is, route measured by the ballbar.

With reference to the projected portion 22, a line is drawn so as to connect a center 24 (fixed central point of the ballbar) of the complete round 20 and a measurement point 25 on the complete round 20, and a point where an extended line thereof 26 crosses the route 21 of the main shaft measured by the ballbar is denoted by 27. At this time, a length D1 between the points 25 and 27 is a deviation (expansion amount) from the complete round 20. Further, if a position obtained by transferring the point 27 to a symmetrical position in the radial direction about the complete round 20, that is, a position that returns toward the center 24 side by DT1=D1 from the point 25 on the extended line 26 is defined as a point 28 (transferred position), a length between the points 24 and 28 is a corrected length. Reference numerals SP1 to SP4 each denote a point where the extended line 26 crosses the complete round 20.

Moreover, with reference to the recessed portion 23, a line is drawn so as to connect the center 24 of the complete round 20 and the measurement point 25 on the complete round 20, and a point where the extended line thereof 26 crosses the route 21 of the main shaft measured by the ballbar is denoted by 27A. At this time, a length D2 between the points 25 and 27A is a deviation (contraction amount) from the complete round 20. Further, if a position obtained by transferring the point 27A to a symmetrical position in the radial direction about the complete round 20, that is, a position that travels toward the opposite side of the center 24 by DT2=D2 from the point 25 on the extended line 26 is defined as a point 28A (transferred position), a length between the points 24 and 28A is a corrected length.

By connecting the transferred points in this manner, a transfer line 29 indicated by two-dot chain line is obtained. This transfer line 29 is a working route of the main shaft after correction.

In order to drive the main shaft based on the correction data, differences in the transferred position between the measurement points (a difference of an X-axis element and a difference of a Y-axis element of the corrected length) are found, and these are incorporated into an NC part program as incremental amounts of an X-axis and a Y-axis. The NC part program in the nonvolatile memory 9 is activated by the PMC 11 to control the motion of the main shaft in the X-axis direction and the Y-axis direction through the shaft control circuit 10 and the servo amplifier 12, which corrects the motion of the main shaft, thereby allowing the working of the complete round. In this case, a motion of a table may be controlled in place of the main shaft.

Figure 4:
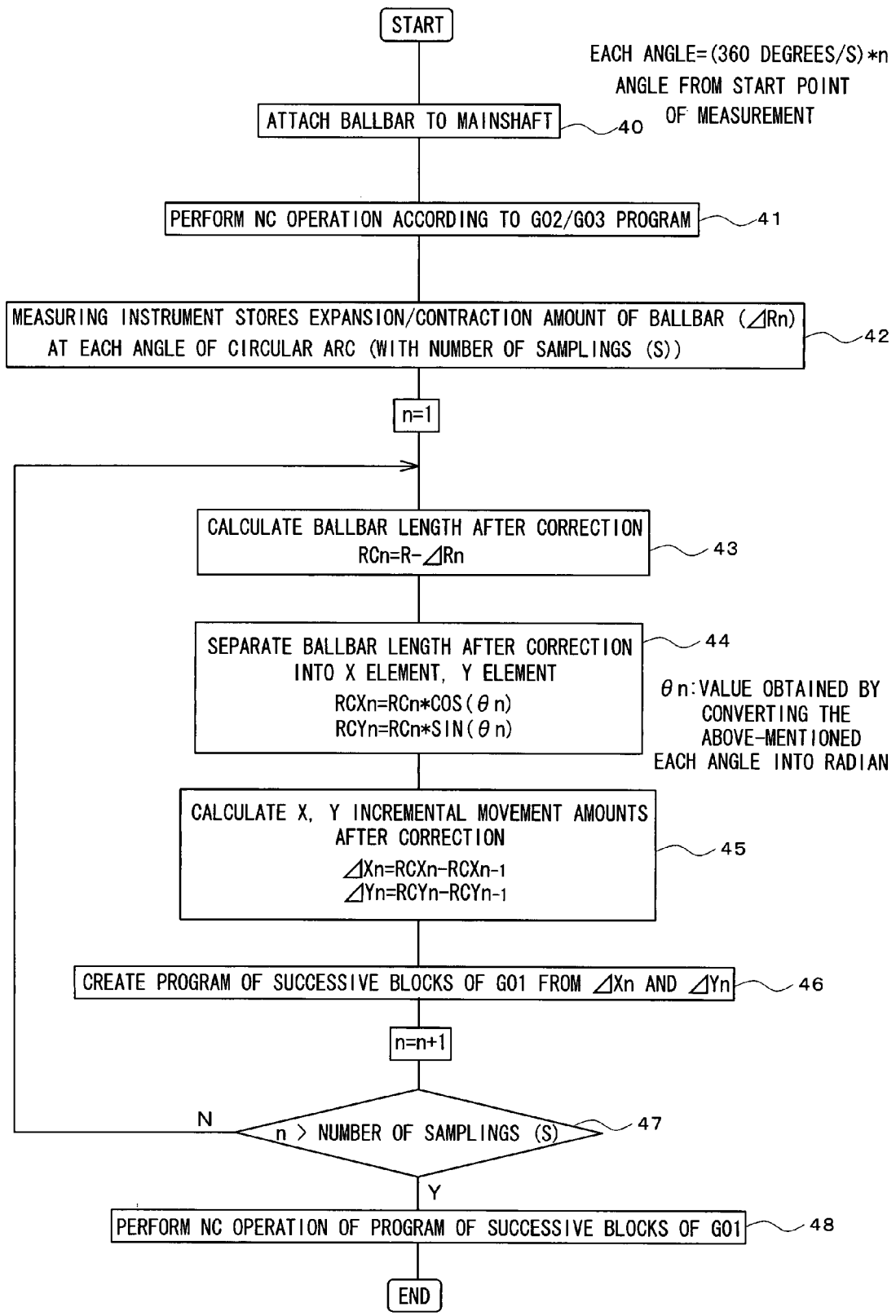
FIG. 4 is a flowchart of the first embodiment of the present invention.

Next, referring to a flowchart of FIG. 4, a more detailed description of the complete round working method of the present invention is given. First, as shown in block 40, the ballbar (not shown) is attached to the main shaft (not shown) of the machine tool 16. Subsequently, in block 41, NC operation is performed according to programs of G02/G03. G02 is a clockwise circular arc operation command for collecting data, and G03 is similarly a counterclockwise circular arc operation command. In next block 42, the measuring instrument 14 stores the expansion/contraction amount ($\Delta R_n$) of the ballbar at each angle (angle from a measurement start position) of the circular arc according to the programs. This expansion/contraction amount is a difference between a measured value (distance from the center 24) of the projected portion 22 or the recessed portion 23 at each of the measurement points and the radial length of the complete round 20. Moreover, A number of samplings S at this time equals 1573. After acquiring the expansion/contraction amounts of the ballbar of the number of samplings, a series of processing of the following blocks 43 to 47 is repeated until a number of repetitions n reaches the number of samplings S.

In block 43, a ballbar length $RC_n$ after correction is calculated by the following formula.

$$RC_n = R - \Delta R_n$$

where R is the radial length of the complete round 20, and $\Delta R_n$ is the above-described expansion/contraction amount.

In block 44 the ballbar length after correction is separated into an X-axis element $RCX_n$ and a Y-axis element $RCY_n$. Calculating formulae in this case are as follows.

$$RCX_n = RC_n * \cos(\theta_n)$$

$$RCY_n = RC_n * \sin(\theta_n)$$

where each angle is represented by (360°/S)*n. Here, n is a number of an arbitrary measurement point. Moreover, $\theta_n$ is a value obtained by converting each angle into radian, and an angle from the start position of the measurement point.

In block 45, incremental movement amounts θX$_n$, ΔY$_n$ of the X-axis element RCX$_n$ and the Y-axis element RCY$_n$ after correction are calculated. Calculating formulae in this case are as follows.

$$\Delta X_n = RCX_n - RCX_{n-1}$$

$$\Delta Y_n = RCY_n - RCY_{n-1}$$

In block 46, an NC part program of successive blocks of G01 (linear interpolation program) created from the X-axis incremental amount ΔX$_n$ and the Y-axis incremental amount ΔY$_n$ at each point is created.

As described above, the series of processing from blocks 43 to 46 is repeated, and if it is determined in determination 47 that the processing has been repeated S times, NC operation of the machine tool 16 is performed according to the NC part program of the successive blocks of G01 created in block 46, as shown in block 48. This allows the motion of the main shaft in the X-axis direction and the Y-axis direction to be controlled through the servo amplifier 12, so that the complete round working for the work is performed.

FIG. 6 is a chart showing an example of the measurement data and processing data. Referring to FIG. 6, a supplementary description of the above-described processing is given.

Column 61 indicates a deviation amount (increased or decreased amount from the radial length of the complete round) measured by the ballbar at each point, which is data copied from the text file in the PC 15 to the spreadsheet software 15B. Here, the radial length of the complete round is assumed to be 100 mm. Column 62 indicates a corrected length (a length of the bar from the center 24 to the transferred position) a teach point when the above-described position transfer is performed based on the above-mentioned deviation amount. This corrected length, when the deviation amount is the contraction amount (minus value), is a value obtained by adding an absolute value of the deviation amount to the radial length of the complete round, and when the deviation amount is the expansion amount (plus value), is a value obtained by subtracting a value of the deviation amount from the radial length of the complete round. Column 63 indicates a number of each of the measurement points that is determined by dividing the complete round into 1573. Column 64 indicates an angle (°) from the point where the measurement starts to the arbitrary point n. Column 65 indicates a value (θ$_n$) obtained by converting the angle into radian. Column 66 indicates a length in the X-axis direction obtained by multiplying the length of the ballbar after correction by COS (θ$_n$), and column 67 indicates a length in the Y-axis direction obtained by multiplying the length of the ballbar after correction by SIN (θ$_n$). Column 68 indicates a converted amount (X-axis) into the incremental amount, and column 69 indicates a converted amount (Y-axis) into the incremental amount. The converted amounts into these incremental amounts are found by converting the bar length after transfer (after correction) at each point into an X-axis element and a Y-axis element to calculate differences of each axis element. These incremental amounts are rounded to the micron, which is a unit for NC commands, to thereby obtain the incremental movement amounts ΔX$_n$, ΔY$_n$ for creating the NC part program indicated in columns 70, 71.

FIG. 5 is a diagram for explaining a creation example of the NC part program. The deviation amount of expansion/contraction from the complete round to the motion of a main shaft 51 is measured by a ballbar system of the measuring instrument 14 at each of measurement points obtained by dividing into 1573 points, and the measurement data is accumulated in the text file in the PC 15 in FIG. 1. The PC 15 copies the measurement data to the spreadsheet software 15B and applies it to the operation processing to calculate data 53 of the respective incremental movement amounts of the X-axis and the Y-axis shown in columns 70, 71 of FIG. 6. This data 53 is incorporated into the NC part program, and the created NC part program is transferred to the nonvolatile memory 9 in FIG. 1 through transfer means such as a memory card. When the activation is commanded from the PMC 11, in block processing 55, the CPU 1 reads the data of an NC part program 54 in the nonvolatile memory 9 character by character to analyze the data, and executes preprocessing of the data to be transmitted to the servo amplifier 12. The CPU 1 creates interpolation data on the basis of a predetermined cycle in interpolation processing 56, and this interpolation data is transmitted to the servo amplifier 12 to control the motion of the main shaft 51 in the X-axis direction and in the Y-axis direction.

In the NC part program 54, the motion of the main shaft 51 in the X-axis and the Y-axis is programmed by G91 (incremental command), G01 (linear interpolation), and F1500 (feed speed).

In this manner, in the first embodiment, using the ballbar of the measuring instrument 14, the working route 21 of the main shaft is divided into a plurality of measurement points (in this example, 1573 points), the length from the center 24 of the complete round to the working route 21 of the main shaft at each of the measurement points is measured, and this measured value is compared with the radial length of the complete round 20 to operate the deviation amounts D1, D2 from the complete round 20 at the respective measurement points. Then, these deviation amounts D1, D2 are transferred symmetrically about the complete round in the radial direction of the complete round 20 to find the transferred positions 28, 28A, and by the X-axis incremental amount and the Y-axis incremental amount obtained from the differences in the transferred position between the respective measurement points (the difference in the X-axis element and the difference in Y-axis element of the corrected length), the deviation amounts D1, D2 are corrected. Therefore, the working of the complete round can be performed without being limited by working position in the X-axis and in the Y-axis, working radius, and working feed speed.

According to the first embodiment, the complete round working is enabled without being affected by a mechanical position error caused by elastic change of the feed axis drive system with change in feed speed and feed direction of the machine tool, or a position error caused by rolling/pitching/yawing motion of a moving body such as a slide carrying the main shaft. Although in a method of performing parameter adjustment using a correction function of NC to improve roundness, it is difficult to determine an appropriate parameter value, according to the present embodiment, such a problem can be also solved.

While in the above-described example, as the correction values for correcting the deviation amount, the X-axis incremental amount, and the Y-axis incremental amount are incorporated into the NC working program, an X-axis absolute value and a Y-axis absolute value may be incorporated into the NC working program as the correction values. The X-axis absolute value and the Y-axis absolute value can be found by adding X-axis and Y-axis incremental amounts ΣΔX$_n$, ΣΔY$_n$ to absolute coordinates of the measurement start position.

While in the above description, the case where the main shaft moves in an X-axis-Y-axis plane is exemplified, the motion of the main shaft is not limited to the X-axis-Y-axis plane, but may be, for example, in an X-axis-Z-axis plane. Moreover, it goes without saying that in order to improve working accuracy, the measurement points are increased in number and that the number of the measurement points is variable depending on the required working accuracy of the complete round.

Second Embodiment

Figure 7:
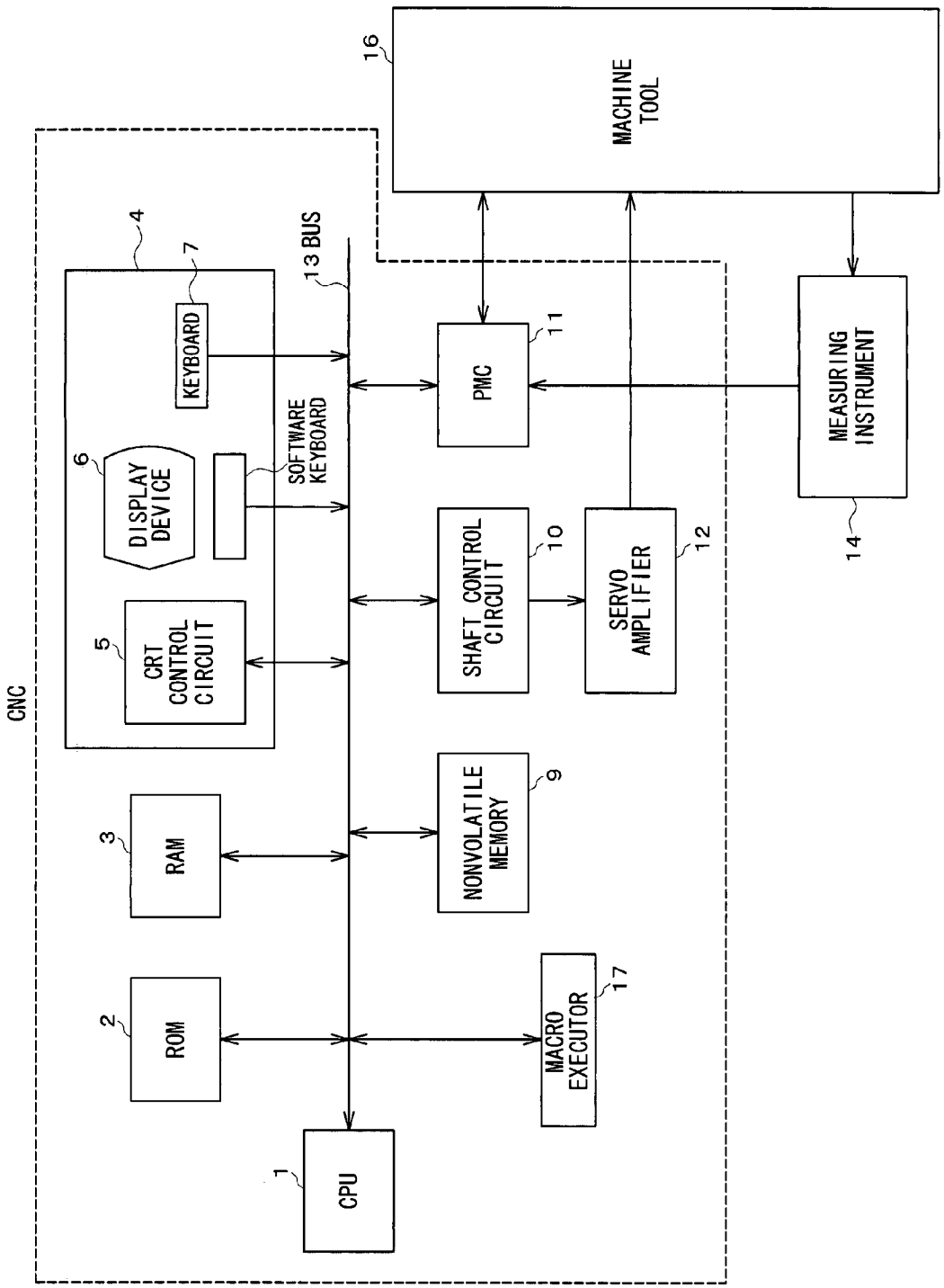
FIG. 7 is a hardware configuration diagram of a second embodiment of the present invention.

Next, a second embodiment in which a copying probe is used as means for measuring the deviation amount is described. FIG. 7 is a hardware configuration diagram of the second embodiment. In FIG. 7, in the numerical control device CNC, a macro executor 17 is provided, and the output of the measuring instrument 14 is supplied to the PMC 11. The measuring instrument 14 is provided with the copying probe.

Figure 8:
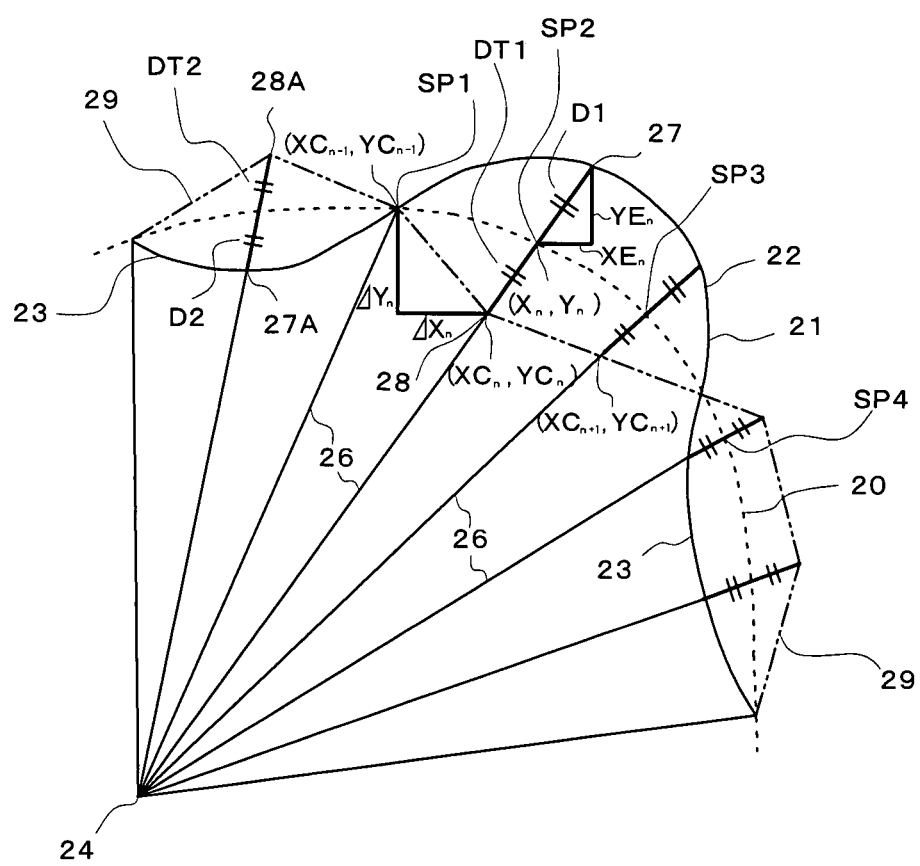
FIG. 8 is a diagram for explaining correction of position error in the second embodiment of the present invention.

Referring to FIG. 8, the correction of the deviation amount in the second embodiment is described. Similar to the case in FIG. 3, with reference to the projected portion 22 of the route 21 of the main shaft, the position 27 is deviated from the complete round 20 by D1 in the radial direction, and with reference to the recessed portion 23 of the route 21 of the main shaft, the position 27A is deviated from the complete round 20 by D2 in the radial direction. If the transfer method described in FIG. 3 is employed, the position obtained by transferring the position 27 of the projected portion 22 symmetrically about the complete round 20 is 28, and the position obtained by transferring the position 27A of the recessed portion 23 symmetrically about the complete round 20 is 28A. With reference to the other measuring points, the transferred position can be found in a similar manner.

$X_n$, $Y_n$ indicate absolute coordinates of the complete round 20. For the respective measurement points SP1 to SP4, absolute coordinates ($XC_n$, $YC_n$) after transfer are found from an X-axis deviation amount $XE_n$ and a Y-axis deviation amount $YE_n$, based on the absolute coordinates ($X_n$, $Y_n$) of the complete round. By calculating differences of the absolute coordinates ($XC_n$, $YC_n$) after transfer between the respective measurement points, the X-axis and Y-axis incremental movement amounts ($\Delta X_n$, $\Delta Y_n$) can be found.

Figure 9:
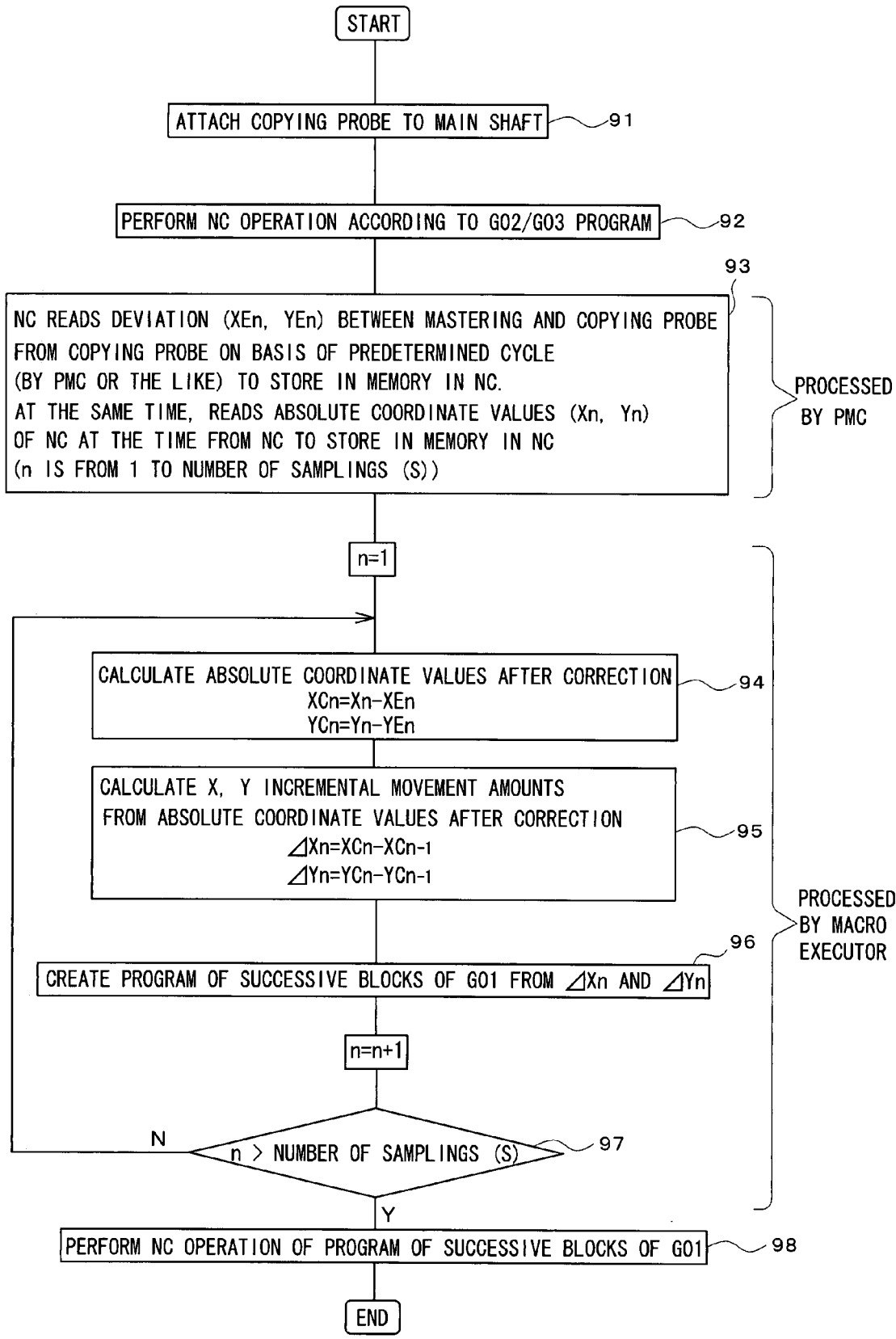
FIG. 9 is a flowchart of the second embodiment of the present invention.

FIG. 9 shows a flowchart of the second embodiment. In block 91, the copying probe (not shown) is attached to the main shaft. In block 92, the NC operation is performed according to the G02/G02 programs. As described above, G02 is the clockwise circular arc operation command, and G03 is a counterclockwise circular arc operation command. In block 93, the numerical control device reads the deviation ($XE_n$, $YE_n$) between mastering and the copying probe from the measuring instrument 14 through the PMC 11 on the basis of a predetermined cycle to store it in the memory (RAM 3 or the nonvolatile memory 9). At the same time, the absolute coordinates ($X_n$, $Y_n$) at this time are read to be stored in the memory (RAM 3 or the nonvolatile memory 9).

Thereafter, a series of following processing in blocks 94 to 97 is repeated until the number of repetitions n reaches the number of samplings S (S=1573). This series of processing is performed by the macro executor 17.

In block 94, based on the absolute coordinates $X_n$, $Y_n$ of the complete round and the X-axis deviation amount $XE_n$ and the Y-axis deviation amount $YE_n$, the absolute coordinates $XC_n$, $YC_n$ after correction are calculated by the following formulae.

$$XC_n = X_n - XE_n$$

$$YC_n = Y_n - YE_n$$

In block 95, the X-axis, Y-axis incremental movements $\Delta X_n$, $\Delta Y_n$ are calculated from the absolute coordinates after correction by the following formulae.

$$\Delta X_n = XC_n - XC_{n-1}$$

$$\Delta Y_n = YC_n - YC_{n-1}$$

In block 96, the NC part program of the successive blocks of G01 (linear interpolation program) created from $\Delta X_n$ and $\Delta Y_n$ is created.

In the above-described manner, the series of processing in blocks 94 to 96 is repeated, and when it is determined in the determination 97 that the number of repetitions n reaches the number of samplings S, the NC operation of the machine tool 16 is performed according to the NC part program of the successive blocks of G01 created in block 96, as shown in block 98. This allows the motion of the main shaft in the X-axis and the Y-axis to be controlled through the servo amplifier 12, so that the complete round working for the workpiece is performed.

Figure 10:
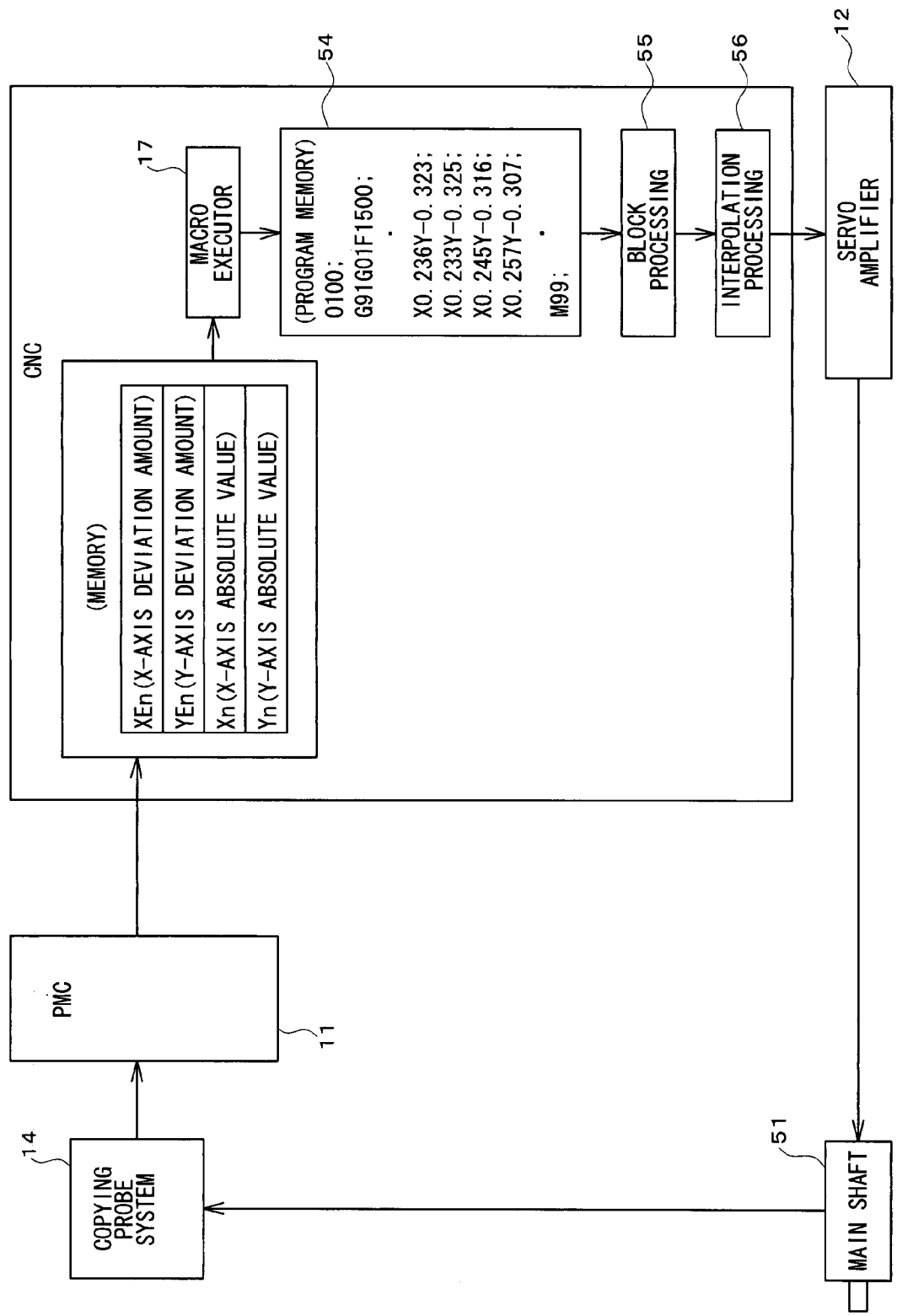
FIG. 10 is a diagram for explaining a creation example of an NC part program in the second embodiment of the present invention.

FIG. 10 is a diagram for explaining a creation example of the NC part program in the second embodiment. Similar to the case in FIG. 5, the NC part program is created as shown in block 54, and when the activation is commanded from the PMC 11, in the block processing 55, the CPU 1 reads the data of the NC part program 54 in the nonvolatile memory 9 character by character to analyze the data, and executes pre-processing of the data to be transmitted to the servo amplifier 12. The CPU 1 creates interpolation data on the basis of a predetermined cycle in the interpolation processing 56, and this interpolation data is transmitted to the servo amplifier 12 to control the motion of the main shaft 51 in the X-axis direction and in the Y-axis direction.

As in this second embodiment, in the case where the copying probe is used for the measuring instrument 14, the working route 21 of the main shaft is also divided into a plurality of measurement points (in this example, 1573 points), a length from the center of the complete round 20 to the working route 21 of the mains shaft at each of the measurement points is measured, and this measured value is compared with the radial length of the complete round 20 to operate the deviation amounts D1, D2 from the complete round 20 at each of the measurement points. Then, these deviation amounts D1, D2 are transferred symmetrically about the complete round in the radial direction of the complete round 20 to find the transferred positions 28, 28A, and by the X-axis incremental amount and the Y-axis incremental amount obtained by the differences in the transferred position between the respective measurement points (difference in the X-axis absolute coordinate and difference in Y-axis absolute coordinate), the deviation amounts D1, D2 are corrected. Therefore, the working of the complete round can be performed without being limited by working position in the X-axis and in the Y-axis, working radius, and working feed speed.

According to the second embodiment, the complete round working is also enabled without being affected by a mechanical position error caused by elastic change of the feed axis drive system with change in feed speed and feed direction of the machine tool, or a position error caused by rolling/pitching/yawing motion of a moving body such as a slide carrying the main shaft. Although in the method of performing parameter adjustment using the correction function of NC to improve roundness, it is difficult to determine an appropriate parameter value, according to the present embodiment, such a problem can be also solved.

In the second embodiment, as in the first embodiment, the X-axis absolute value and the Y-axis absolute value may be incorporated into the NC working program in place of the X-axis incremental amount and the Y-axis incremental amount. The motion of the main shaft is not limited to the X-axis-Y-axis plane, but may be, for example, in an X-axis- Z-axis plane, and in place of the main shaft, a table may be moved. In the second embodiment, it also goes without saying that in order to improve working accuracy, the measurement points are increased in number and that the number of the measurement points is variable depending on the required working accuracy of the complete round.

The invention claimed is:

1. A complete round working method in an numerical control (NC) machine tool for performing complete round working by contouring working with the NC machine tool that controls a motion of a main shaft by an NC working program, wherein the complete round working is performed by the steps of:
performing NC operation according to a circular arc operation command before performing complete round working for a work in a state where a device for measuring a deviation from the complete round in a radial direction to the main shaft is attached to the main shaft;
dividing a working route of the main shaft into a plurality of measurement points and setting the plurality of measurement points on the complete round by dividing the complete round at equal angles in a circumferential direction, wherein, for each measurement point, measuring a length from a center of the complete round to a point where a line drawn between the center of the complete round and each measurement point or an extended line thereof crosses the actual working route of the main shaft by using said device attached to the main shaft;
comparing a measured value obtained from the measurement by said device with a radial length of the complete round to measure a deviation amount of the working route of the main shaft from the complete round at each of the measurement points;
based on said deviation amount, calculating a correction value for correcting the working route of the main shaft at each of the measurement points, and incorporating this correction value into said NC working program; and
controlling the motion of the main shaft according to said NC working program to perform the complete round working for the work,
wherein said complete round is divided at equal angles of 360°/S in said circumferential direction where S represents number of samplings, and
wherein said measuring of the deviation amount and said calculating of the correction value are repeated until a number of repetitions reaches S.

2. The complete round working method according to claim 1, wherein a transferred position is found by transferring the deviation amount of said working route from the complete round symmetrically about the complete round in a radial direction of the complete round, and said correction value is calculated based on position data of this transferred position.

3. The complete round working method according to claim 2, wherein said correction value is an incremental amount of each coordinate axis obtained from a difference in the transferred position between the respective measurement points, or an absolute value of each coordinate axis of the transferred position at each of the measurement points.

4. A complete round working device in an NC machine tool that performs complete round working by contouring working with the NC machine tool that controls a motion of a main shaft by an NC working program, comprising:
means for performing NC operation according to a circular arc operation command before performing complete round working for a work in a state where a device for measuring a deviation from the complete round in a radial direction to the main shaft is attached to the main shaft;
a measuring instrument that divides a working route of the main shaft into a plurality of measurement points and sets the plurality of measurement points on the complete round by dividing the complete round at equal angles in said radial direction, wherein, for each measurement point, measures a length from a center of the complete round to a point where a line drawn between the center of the complete round and each measurement point or an extended line thereof crosses the actual working route of the main shaft;
an operating unit that compares a measured value obtained from the measurement by said device with a radial length of the complete round to measure a deviation amount of the working route of the main shaft from the complete round at each of the measurement points, and based on this deviation amount, calculates a correction value for correcting the working route of the main shaft at each of the measurement points; and
a controlling unit that controls the motion of the main shaft according to the NC working program into which the correction value operated by said operating unit is incorporated,
wherein by controlling the motion of the main shaft by said controlling unit, the complete round working for the work is performed, and
wherein said measurement unit divides the complete round at equal angles of 360°/S in said circumferential direction where S represents number of samplings, and
wherein said operating unit repeats measurement of the deviation amount and calculation of the correction value until a number of repetitions reaches S.

5. The complete round working device according to claim 4, wherein said operating unit transfers the deviation amount of said working route from the complete round symmetrically about the complete round in a radial direction of the complete round to find a transferred position, and based on position data of this transferred position, calculates said correction value.

6. The complete round working device according to claim 5, wherein said correction value is an incremental amount of each coordinate axis obtained from a difference in the transferred position between the respective measurement points, or an absolute value of each coordinate axis of the transferred position at each of the measurement points.

* * * * *